Aug. 5, 1952   J. W. PRATT   2,605,838
MACHINE FOR PREPARING SHOE UPPERS FOR LASTING
Original Filed Feb. 26, 1948   3 Sheets-Sheet 3
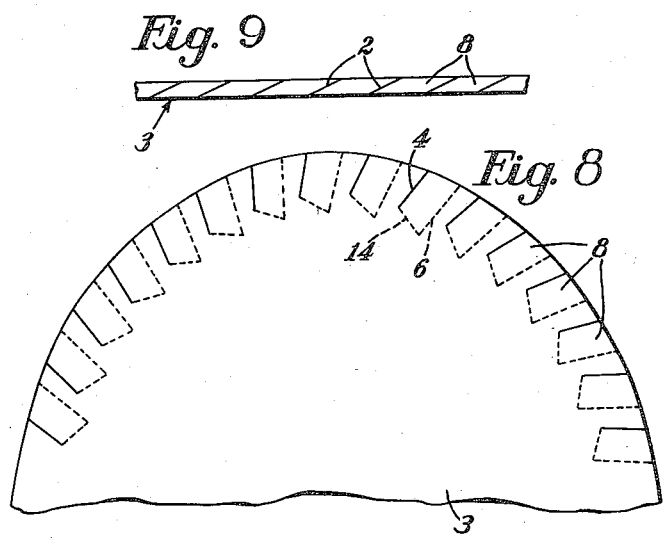
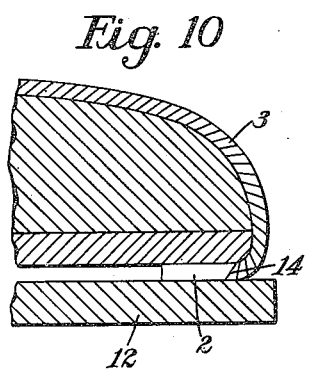
Inventor
John W. Pratt
By his Attorney Patented Aug. 5, 1952

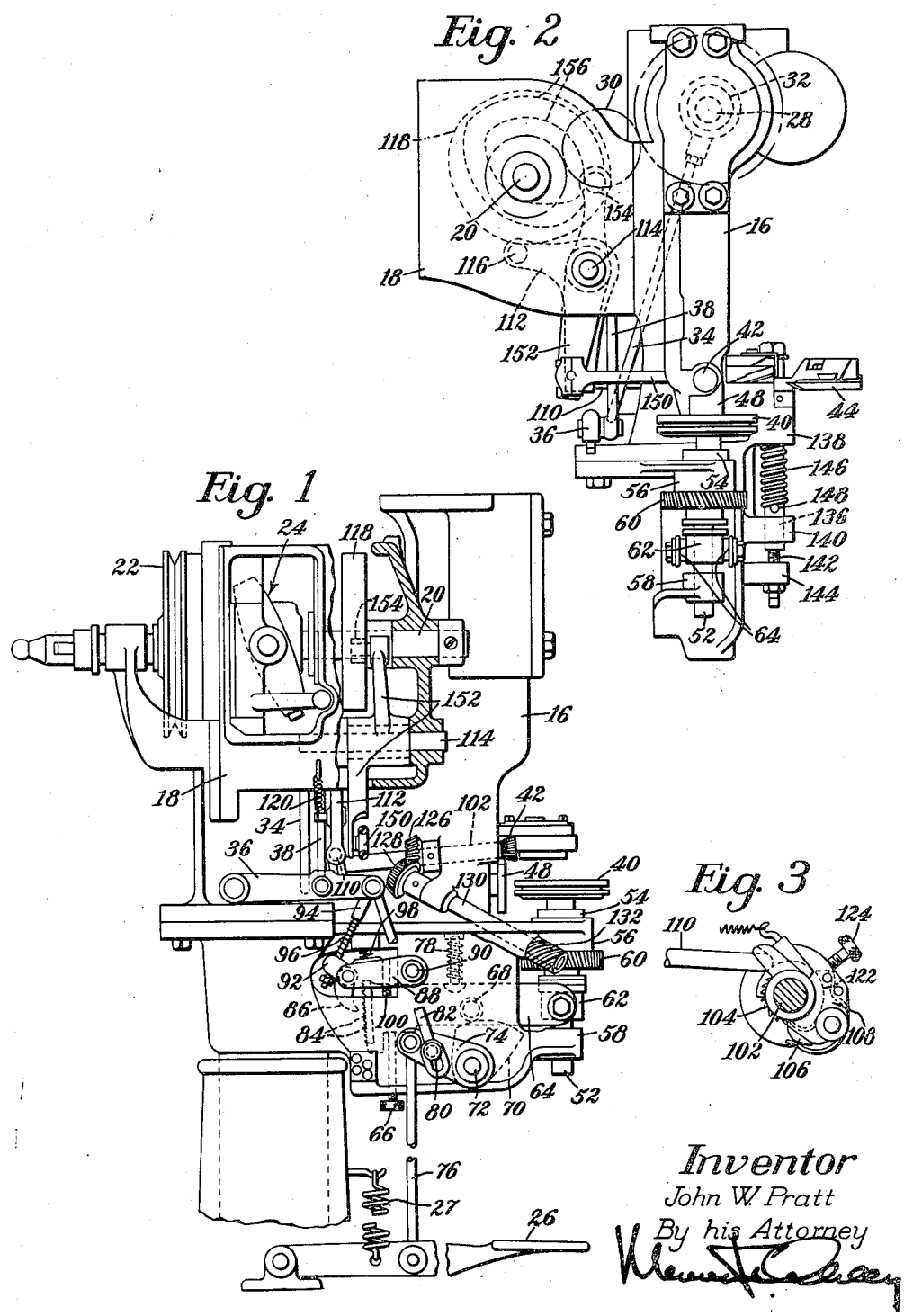

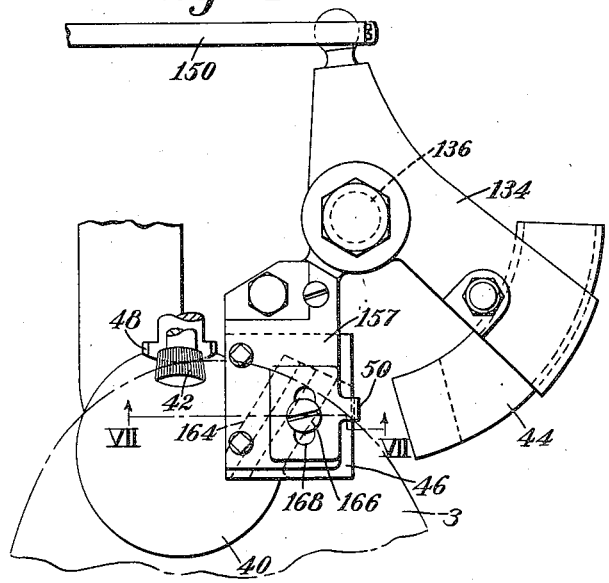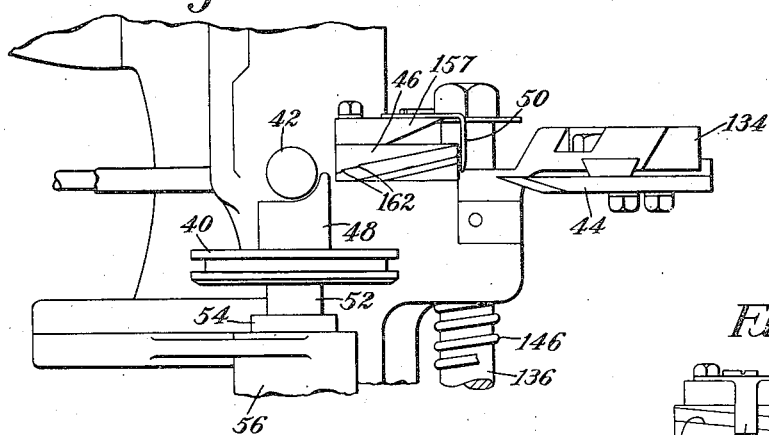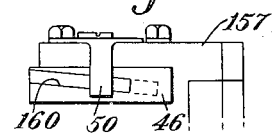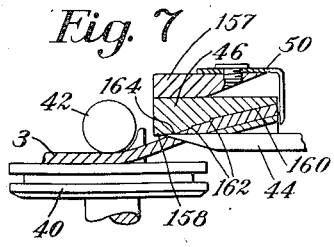

2,605,838

UNITED STATES PATENT OFFICE 2,605,838

MACHINE FOR PREPARING SHOE UPPERS FOR LASTING

John William Pratt, Leicester, England, assignor to United Shoe Machinery Corporation, Flemington, N. J., a corporation of New Jersey Original application February 26, 1948, Serial No. 10,976, now Patent No. 2,523,480, dated September 26, 1950. Divided and this application January 29, 1949, Serial No. 73,595. In Great Britain March 25, 1947

6 Claims. (Cl. 164—50)

This invention relates to machines for preparing shoe uppers for lasting, the term "shoe" being used herein as applicable to outer footwear generally. The present application is a division of a copending application for Letters Patent for improvements in Methods and Machines for Preparing Uppers for Lasting, Serial No. 10,976, filed on February 26, 1948 and on which Letters Patent No. 2,523,480 were granted on September 26, 1950.

In the manufacture of shoes having uppers of comparatively heavy material, such as those used by agricultural workers in which each upper may include a layer of leather approximately an eighth of an inch in thickness, it is difficult satisfactorily to conform an end portion of the upper, e. g., the toe portion, to the contour of the last and to the margin of an insole on the last. In attempting to last the toe ends of such uppers by the use of a machine of the type having toe-embracing wipers, such, for example, as the automatic toe-lasting machine shown in United States Letters Patent No. 2,134,148, granted on October 25, 1938 on an application of W. T. B. Roberts, results have not been as satisfactory as desired because of the fact that the stiff and harsh nature of the upper material tends to prevent the marginal portion of the upper from being wiped inwardly over the insole without the formation of large unwieldy pleats. The presence of such pleats makes it necessary, prior to the attachment of an outsole to the shoe, to trim off substantial portions of the margin of the upper over the insole in order that a satisfactorily water-tight joint between the upper and the outsole may be produced, and such extensive trimming necessarily weakens the joint between the upper and the insole. If, on the other hand, the marginal portion of the upper is subjected to a skiving operation to reduce its thickness or to a so-called pinking operation by which V-shaped notches are made in the margin prior to lasting, there is likewise a tendency to weaken the joint between the upper and the insole. It has, therefore, been the common practice heretofore to last the toe ends of such shoes by the use of a step-by-step lasting machine. This, however, takes considerably more time than would be necessary if such shoes could be satisfactorily lasted in a machine of the above-mentioned type, and also involves more strain on the operator.

In view of the above considerations, the present invention provides a machine for preparing uppers for lasting in such manner that the toe ends of shoes having comparatively heavy uppers may be satisfactorily lasted by the use of a machine having toe-embracing wipers without involving any undue weakening of the joint between the margin of the upper and the insole. By the machine herein shown a plurality of slits are formed in the curved margin of the upper around its toe-end portion before the upper is mounted on a last, the slits extending obliquely through the margin of the upper and terminating on the outer and inner surfaces of the upper (i. e., on the grain and flesh sides respectively of a leather upper) in lines extending inwardly from points on the curved edge of the upper in oblique relation to imaginary lines tangential to the curve of the edge of the upper at those points. Preferably the slits extend at angles of approximately 25° to the outer and inner surfaces of the upper and terminate on those surfaces in lines at angles of approximately 70° to the above-mentioned imaginary lines. As illustrated also the slits extend less far inwardly from the edge of the upper on its outer surface than on its inner surface. The slits thus divide the marginal portion of the upper into a plurality of tabs which overlap one another to a substantial extent. It has been found that when the marginal portion of an upper so treated is thereafter wiped inwardly over an insole on a last by the toe-embracing wipers of a lasting machine the overlapping tabs thus formed move relatively to one another lengthwise of the edge of the upper in such manner that the margin of the upper is readily bedded down on the insole by the wipers without any abrupt variations in its thickness around the end of the shoe bottom. Furthermore, the relation of the tabs to one another and to adjacent portions of the upper is such that tacks driven through them will hold the upper securely in lasted position. Since the slits do not extend so far inwardly from the edge of the upper on its outer surface as on its inner surface, the inner extremities of the slits are amply covered by the outsole for better insurance of a water-tight joint. To prepare the upper in this manner the machine herein shown is provided with means for intermittently feeding the toe end of the upper in a direction lengthwise of its edge, a reciprocatory knife for forming slits in the margin of the upper in proper time relation to its feeding movements, and means for guiding and positioning the upper in such relation to the path of movement of the knife as to cause the slits to be formed in the above-described relation to the upper.

The novel features of the invention will now be more particularly described with reference to the accompanying drawings and thereafter pointed out in the claims.

In the drawings,

Fig. 1 is a view partly in left-hand side elevation and partly in section, showing mainly the upper portion of the machine in which the invention is herein shown as embodied;

Fig. 2 is a view of the upper portion of the machine in front elevation;

Fig. 3 is a detail view, partly in front elevation and partly in section, showing a portion of the means for feeding the upper;

Fig. 4 is a plan view, on an enlarged scale, showing the upper-slitting knife and the means for supporting and guiding the upper;

Fig. 5 is a view in front elevation of the portion of the machine shown in Fig. 4;

Fig. 6 is a view in right-hand side elevation of certain parts shown in Figs. 4 and 5;

Fig. 7 is a section on the line VII—VII of Fig. 4;

Fig. 8 is a plan view showing in a flat condition the toe-end portion of an upper after it has been operated upon by the machine;

Fig. 9 is a view in elevation of a portion of the edge of the upper shown in Fig. 8; and Fig. 10 is a sectional view of the toe end of a shoe of which an upper prepared by the machine forms a part, the shoe being shown as it appears after the outsole has been applied.

With reference first to Figs. 8, 9 and 10, the machine hereinafter described forms a plurality of cuts or slits 2 in the curved margin of the upper 3 before the upper is mounted on a last. These slits are formed at evenly spaced intervals about the greater portion of the toe end of the upper, and they extend in planes obliquely through the margin of the upper, preferably at angles of approximately 25° to the outer and inner surfaces of the upper, i. e., the grain side and the flesh side respectively of a leather upper. When the upper materials include a plurality of layers, the slits are formed in the comparatively heavy outer layer only, and it is this layer which is commonly herein referred to as the upper. The slits terminate on the outer and inner surfaces of the upper in lines 4 and 6 respectively (Fig. 8), and they preferably extend inwardly from the edge of the upper distances nearly as great as the width of that marginal portion of the upper which is to be lasted inwardly over the insole. They extend, however, less far inwardly on the outer surface of the upper than on the inner surface, as indicated in Fig. 8 by the difference in length of the lines 4 and 6 respectively. The slits are so formed, moreover, that these lines extend inwardly from points on the curved edge of the upper at angles of approximately 70° to imaginary lines tangential to the curve of the edge of the upper at those points. The slits may be spaced, for example, about three-eighths of an inch apart, and they thus divide the margin of the upper into a plurality of tabs 8 which overlap one another to a substantial extent and are each substantially rhombic as viewed edgewise, as illustrated in Fig. 9.

It will be understood that after an upper thus prepared has been assembled with an insole on a last, it is commonly subjected first to a pulling-over operation. Since the overlapping tabs 8 are comparatively narrow, the toe-end gripper of the pulling-over machine, and possibly also those side grippers which are located comparatively near the end of the toe, will each close on at least two of the tabs and will thus tension the upper satisfactorily without any substantial danger that any of the tabs will be detached from the rest of the upper. Furthermore, the tacks driven by the pulling-over machine to fasten the upper in pulled-over position will commonly pass through two of the tabs, since in presenting the upper to the grippers its margin will be contracted to some extent and the tabs will thus be caused to overlap one another to a greater extent than when the upper is flat. The upper will therefore be securely fastened by the tacks.

If the toe end of the shoe is thereafter lasted in a machine of the type having toe-embracing wipers, such as the automatic machine shown in the previously mentioned Letters Patent No. 2,134,148, the wipers will wipe the marginal portion of the upper inwardly over the insole without encountering any undue resistance and without forming any large or unwieldy pleats in the upper, i. e., without causing any abrupt variations in thickness along its margin. This is because the tabs 8 will slide evenly over one another as the length of the marginal edge of the upper is decreased. Contributing substantially to these desirable results is the particular angular relation of the slits 2 to the outer and inner surfaces of the upper and to the edge of the upper, as hereinbefore described. It has been found, for example, that much better results are thus obtained than would be the case if the slits were so formed that the lines 4 and 6 at the termination of the slits on the outer and inner surfaces of the upper were perpendicular to lines tangential to the curve of the edge of the upper at the outer ends of such terminal lines. A further substantial advantage arising from the fact that the slits extend inwardly from the edge of the upper less far on the outer surface of the upper than on its inner surface is that the points where the slits terminate on the outer surface are far enough inwardly from the edge of the last bottom to be amply covered by the outsole, which contributes to the formation of a watertight joint between the outsole and the upper. This is illustrated in Fig. 10, where the outsole is shown at 12 and the limit of one of the slits in the upper is indicated by the line 14.

The machine herein shown for forming the slits in the upper includes a head casting 16 to the left-hand side of which is secured a casing 18 provided with bearings for a cam shaft 20, this shaft having rotatably mounted upon it a pulley 22 driven from any suitable source of power. The pulley 22 is arranged to be coupled to the cam shaft 20 by a clutch 24 of any suitable type, preferably one which will cause the machine to operate continuously as long as a clutch-actuating treadle 26 is held depressed against the resistance of a spring 27. Rotatably mounted in the head casting 16 is another shaft 28 driven by the shaft 20 at half the speed of the latter through suitable gearing 30. Fixed on the shaft 28 is an eccentric 32 which, through a rod 34, controls a clutch-tripping lever 36 operated as hereinafter described by the treadle 26 to start the machine, the lever 36 being arranged to trip the clutch through means including a rod 38. The lower end of the rod 34 is seated in a socket in the lever 36, and when the treadle 26 is released by the operator the rod prevents the lever 36 from moving upwardly to cause the machine to come to a stop except as permitted by the eccentric 32, the arrangement therefore being such that the cam shaft 20 will come to a stop only in a predetermined position.

The machine is further provided with a circular work-supporting table 40 rotatable about a vertical axis, a feed wheel 42 arranged to cooperate with the table, when the latter has been raised as hereinafter described from a lowered inoperative position to an operative position, to feed the marginal portion of an upper gripped between the table and the feed wheel, and a flat arcuate upper-slitting knife 44 movable in a plane and arranged to cooperate with a shear block 46 to form the slits in the margin of the upper. The upper is guided in its feeding movements by the shear block and by two edge gages 48 and 50 (Fig. 4), these parts cooperating to position the upper in such relation to the path of movement of the knife as to cause the latter to form the slits in the desired relation to the upper, as more particularly hereinafter described. It will be evident that the marginal portion of the toe end of the upper thus guided by the edge gages 48 and 50 is fed by the feed wheel 42 in a path curved similarly to the edge of the upper.

The work-supporting table 40 is fast on the upper end of a vertical shaft 52 extending downwardly through a sleeve 54 to which it is keyed in such manner as to rotate therewith but to permit it to be moved upward relatively to the sleeve. The sleeve is rotatably mounted in a lug 56 on the head casting 16, and below this lug the shaft is mounted for rotary and vertical movements in another lug 58 on the head casting. Immediately below the lug 56 the sleeve 54 has secured to it a spiral gear 60 the upper face of which engages the lower face of the lug to prevent any upward movement of the sleeve. Downward movement of the sleeve is prevented by engagement of a shoulder thereon with the upper face of the lug. Below the sleeve 54 the shaft is reduced in diameter and has thereon a shoulder supported by a collar 62 in which the shaft is free to turn. This collar is pivotally connected to the bifurcated front end of a rearwardly extending floating lever 64 the rear end portion of which is arranged normally to rest on the upper end of a vertical screw 66 threaded in the head casting. Substantially midway between this screw and the front end of the lever a roll 68 is mounted on the lever and is engaged by a segmental cam member 70 fast on a shaft 72. Fast on the left-hand end of this shaft is an arm 74 connected by a link 76 to the treadle 26. A compression spring 78 confined between the top of the lever and a lug on the head casting 16 holds the roll 68 at all times in engagement with the cam 70, the spring acting on the lever in a location farther rearwardly than the roll. When the treadle is depressed, therefore, the front end of the lever first is swung upwardly by the cam 70 and the work table 40 is thus raised to clamp the upper between it and the feed wheel 42. The arm 74 has projecting laterally from it a stud 80 which extends through the slotted lower end of an upwardly extending link 82 connected at its upper end to the clutch-tripping lever 36. This slotted link permits the work table to be raised by the treadle as above described to clamp the upper before the clutch is tripped, after which further movement of the treadle serves to trip the clutch. In response to this further movement of the treadle the cam 70 swings the rear end of the lever 64 upwardly about the connection between the lever and the collar 62. The lever has formed on its rear end a series of ratchet teeth 84 arranged to be engaged by a pawl 86 pivotally mounted on an arm 88 which is fast on a horizontal shaft 90 in the head casting. The pawl has thereon an arm 92 connected by a rod 94 to the clutch-tripping lever 36, a spring 96 being interposed between the arm and a shoulder on the rod, so that as the clutch-tripping lever is swung downwardly to trip the clutch the pawl 86 is swung into engagement with the ratchet teeth 84 and held yieldingly against the teeth. The arm 88, moreover, is controlled by a spring 98 which tends to swing it downwardly, its downward movement being limited by a screw 100 which is threaded in the arm and engages a face on the head casting. The construction is accordingly such that after the upper has been clamped between the work table and the feed wheel by the action of the cam 70, the further movement of the treadle, whereby the clutch-tripping lever 36 is swung downwardly, first causes the pawl 86 to engage the teeth 84 on the rear end of the lever 64, after which the continued movement of the cam 70 as the treadle is further depressed causes the lever 64 to swing upwardly about its connection with the collar 62, not only against the resistance of the spring 78, but also against the resistance of the spring 98 which opposes the upward movement of the arm 88. That is, the rear end of the lever 64 acts through the pawl 86 to swing the arm 88 upwardly against the resistance of the spring 98. This causes the upper to be clamped yieldingly and still more firmly between the work table and the feed wheel.

The feed wheel 42, which is serrated to prevent it from slipping on the upper, is fixed on the front end of a rearwardly and downwardly inclined shaft 102 which has fast on its rear end a ratchet wheel 104 (Fig. 3). This ratchet wheel is operated by a spring-pressed pawl 106 carried by an arm 108 which is pivotally mounted on the shaft 102 and is oscillated through a link 110 by a bell-crank lever 112 (Fig. 2) mounted on a shaft 114 in the casing 18. This lever being provided with a roll 116 engaged by the periphery of a cam 118 on the cam shaft 20. A spring 120 (Fig. 1) is connected to the bell-crank lever 112 to hold the roll 116 at all times against the cam. A shield 122 rotatably mounted on the shaft 102 is adjustable by a setscrew 124 to determine variably the time when the pawl 106 engages the ratchet wheel 104 and thus to determine the amount of upper-feeding movement imparted to the feed wheel 42. The feed-wheel shaft 102 has fast thereon a bevel-gear 126 in engagement with a bevel-gear 128 fast on an inclined shaft 130 which carries a spiral gear 132 in engagement with the previously mentioned gear 60 on the sleeve 54. Accordingly, the work table 40 is turned simultaneously with the feed wheel 42 by the pawl-and-ratchet mechanism shown in Fig. 3.

The upper-slitting knife 44 is fast on the front end of a lever 134 secured to the upper end of a vertical shaft 136 which is mounted to rotate in bearings 138 and 140 (Fig. 2) formed on the head casting 16. The shaft 136 is adjustable vertically by means of a screw 142 threaded in a lug 144 on the head casting and located beneath the lower end of the shaft. The shaft is held in engagement with the screw by a spring 146 which extends around the shaft and is confined between the upper bearing 138 and a pin 148 in the shaft. The rear end of the lever 134 is connected by a link 150 to the lower end of a lever 152 mounted between its ends to swing about the previously mentioned shaft 114. The upper arm of this lever carries a roll 154 which lies in a cam groove 156 formed in the previously mentioned cam 118. The link 150 is connected to the lever 134 and the lever 152 by ball-and-socket joints to permit the link to have the necessary lateral play in the swinging of the lever 134.

The previously mentioned shear block 46 extends partially over the work table 40 at the right of the feed wheel 42 and is secured to a member 157 fast on the head casting 16. It is provided with a lower horizontal surface 158 (Fig. 7) and with an upper-guiding slot 160 downwardly inclined from right to left. Extending downwardly into this slot near its left-hand lower end are two short projections 162 (Figs. 5 and 7) for a purpose hereinafter described. The slot 160 opens into the front face, the right-hand face and the lower horizontal face of the shear block. The edge 164 (Figs. 4 and 7) formed by the intersection of the upper surface of the slot and the lower horizontal surface of the block serves as a shearing edge with which the knife 44 cooperates to form the slits in the upper, as illustrated in Fig. 7, and in order that this shearing edge will be approximately parallel to the edge of the knife at the time when the knife acts on the upper the slot 160 is also downwardly inclined in a rearward direction (Fig. 6). The downward inclination of the slot 160 from right to left is such that the slits formed by the knife are at angles of approximately 25° to the outer and inner surfaces of the upper. It will be understood that when the curved toe end of the upper is positioned in the slot 160 and between the feed wheel and the work-supporting table its curved edge is in engagement with the two edge gages 48 and 50, as illustrated in Fig. 4. The edge gage 48 is positioned at the left-hand side of the shear block 46 below the feed wheel 42 and extends upward partially around the feed wheel, as shown in Fig. 5, and it is adjustable in forward and rearward directions. The edge gage 50, which engages the upper at the right-hand side of the shear block, is secured by a screw 166 to the upper face of the member 157, the screw extending through a slot 168 in the gage to permit the latter also to be adjusted in forward and rearward directions. A portion of this gage extends downwardly across the right-hand end of the slot 160. The two edge gages, when properly adjusted, cooperate to position the upper in such relation to the shearing edge 164 and to the path of movement of the knife that the lines in which the slits formed in the upper terminate on the outer and inner surfaces of the upper form angles of approximately 70° with lines tangential to the curve of the edge of the upper at the outer extremities of the first-mentioned lines. With the upper thus positioned, moreover, the slits formed by the knife extend farther inwardly from the edge of the upper on its inner or flesh surface than on its outer or grain surface, its grain surface being uppermost in the machine. In other words, the path of the knife intersects the margin of the upper from its edge inwardly in oblique relation to the inner and outer faces of the upper and intersects those faces on lines oblique at their outer extremities to lines tangent at those points to the curved edge of the upper, the path of the knife extending farther inwardly from the edge of the upper on the inner face of the upper than on its outer face. The previously mentioned projections 162 in the slot 160 of the shear block, which are located near the shearing edge 164, serve by engagement with the upper to insure that it will not slip in the slot in the direction of its feeding movement by reason of the force applied thereto by the knife 44 in forming the slits.

In the use of the above-described machine the operator presents the toe end of an upper grain side uppermost with a portion of its margin in the slot 160 of the shear block 46 and another portion under the feed wheel 42, the upper being in such relation to the shearing edge 164 of the shear block that the knife will form the first slit therein at the left-hand side of the toe. As the upper is thus presented its edge is engaged by the two gage members 48 and 50 which have been properly adjusted to determine the depth of the slits and the directions in which they will extend inwardly from the edge of the upper. The operator thereafter depresses the treadle 26 to raise the table 40 and thus to clamp the upper yieldingly between the table and the feed wheel, as hereinbefore described. Further depression of the treadle serves to trip the clutch and thus to start the operation of the machine. Upon the starting of the machine the knife is first operated to form a slit in the upper and then returns to its initial position, after which the feed wheel 42 and the table 40 are rotated by the pawl-and-ratchet mechanism shown in Fig. 3 to advance the margin of the upper into position for the knife to form the next slit therein, the amount of this advancing movement, which may be about three-eights of an inch, being determined by the adjustment of the pawl-controlling shield 122 (Fig. 3). As the upper is thus fed the operator controls it in such manner as to maintain its edge against the gage members 48 and 50. The machine continues thus to operate on the upper as long as the operator holds the treadle depressed. When he releases the treadle, it is returned by the spring 27, thus causing the machine to come to a stop and the work table to be lowered to release the upper, the eccentric 32 and the rod 34 controlling the clutch-tripping lever 36 in such manner that when the machine comes to a stop the knife 44 is in its initial position.

Having described the invention, what I claim as new and desire to secure by Letters Patent of the United States is:

1. A machine for preparing shoe uppers for lasting having, in combination, means for feeding the margin of the toe end of an upper intermittently in a path curved similarly to the edge of the upper before the upper is mounted on a last, an upper-slitting knife mounted for reciprocatory movements in a path intersecting the curved path of the margin of the upper from the edge of the upper inwardly in oblique relation to the opposite faces of the upper, said knife being arranged to move in a path such that it cuts farther inwardly from the edge of the upper on the inner face of the upper than on its outer face, and means for thus moving said knife repeatedly to slit the margin of the upper in time relation to its feeding movements.

2. A machine for preparing shoe uppers for lasting having, in combination, means for feeding the margin of the toe end of an upper intermittently in a path curved similarly to the edge of the upper before the upper is mounted on a last, an upper-slitting knife mounted for movement first into engagement with the margin of the upper on its inner face and then through said margin to its outer face in a path intersecting the curved path of said margin from the edge of the upper inwardly in oblique relation to its inner and outer faces, said knife being arranged to move in a path such that it cuts farther inwardly from the edge of the upper on the inner face of the upper than on its outer face, and means for thus moving said knife repeatedly to slit the margin of the upper in time relation to its feeding movements.

3. A machine for preparing shoe uppers for lasting having, in combination, means for feeding the margin of the toe end of an upper intermittently in a path curved similarly to the edge of the upper before the upper is mounted on a last, an upper-slitting knife mounted for reciprocatory movements in a path intersecting the curved path of the margin of the upper from the edge of the upper inwardly in oblique relation to the opposite faces of the upper, said knife being arranged to move in a path such that it cuts the upper on lines oblique at their outer extremities to lines tangent at those extremities to the convexly curved edge of the upper, and means for thus moving said knife repeatedly to slit the margin of the upper in time relation to its feeding movements.

4. A machine for preparing shoe uppers for lasting having, in combination, means for feeding the margin of the toe end of an upper intermittently in a path curved similarly to the edge of the upper before the upper is mounted on a last, an upper-slitting knife mounted for movement first into engagement with the margin of the upper on its inner face and then through said margin to its outer face in a path intersecting the curved path of said margin from the edge of the upper inwardly in oblique relation to its inner and outer faces and intersecting said faces on lines oblique at their outer extremities to lines tangent at those extremities to the convexly curved edge of the upper, said knife being arranged to move in a path such that it cuts farther inwardly from the edge of the upper on the inner face of the upper than on its outer face, and means for thus moving said knife repeatedly to slit the margin of the upper in time relation to its feeding movements.

5. A machine for preparing shoe uppers for lasting having, in combination, means for feeding the margin of the toe end of an upper intermittently in a direction lengthwise of its edge, gages for guiding said margin in a path curved similarly to the edge of the upper by engaging said edge in different locations respectively, an upper-slitting knife mounted for reciprocatory movements in a path intersecting the curved path of the margin of the upper from the edge of the upper inwardly in oblique relation to the opposite faces of the upper, said knife being arranged to move in a path such that it cuts farther inwardly from the edge of the upper on the inner face of the upper than on its outer face, and means for thus moving said knife repeatedly to slit the margin of the upper in time relation to its feeding movements.

6. A machine for preparing shoe uppers for lasting having, in combination, means for feeding the margin of the toe end of an upper intermittently in a direction lengthwise of its edge, gages for guiding said margin in a path curved similarly to the edge of the upper by engaging said edge in different locations respectively, an upper-slitting knife mounted for reciprocatory movements in a path intersecting the curved path of the margin of the upper from the edge of the upper inwardly in oblique relation to the opposite faces of the upper, said knife being arranged to move in a path such that it cuts the upper on lines oblique at their outer extremities to lines tangent at those extremities to the convexly curved edge of the upper, and means for thus moving said knife repeatedly to slit the margin of the upper in time relation to its feeding movements.

JOHN WILLIAM PRATT.

REFERENCES CITED

The following references are of record in the file of this patent:

UNITED STATES PATENTS

| Number | Name | Date |
| --- | --- | --- |
| 685,991 | Knipe | Nov. 5, 1901 |
| 728,532 | Arnold | May 19, 1903 |
| 855,753 | Brewer | June 4, 1907 |
| 970,702 | Goddu | Sept. 20, 1910 |
| 1,031,694 | Deats | July 9, 1912 |
| 1,678,319 | Blessing | July 24, 1928 |
| 1,705,605 | Elliott | Mar. 19, 1929 |